B. BORGMAN.
VARIABLE SPEED TRANSMISSION GEARING.
APPLICATION FILED SEPT. 14, 1909.

970,879.

Patented Sept. 20, 1910.

2 SHEETS—SHEET 1.

Witnesses
S. P. Buck.
P. M. Smith.

Inventor
Bernard Borgman

By Victor J. Evans
Attorney

B. BORGMAN.
VARIABLE SPEED TRANSMISSION GEARING.
APPLICATION FILED SEPT. 14, 1909.
970,879.
Patented Sept. 20, 1910.
2 SHEETS—SHEET 2.
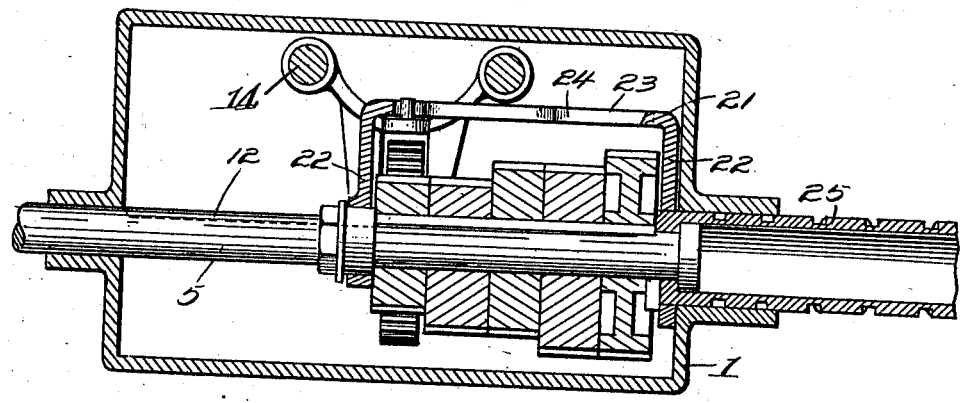
Fig. 3.
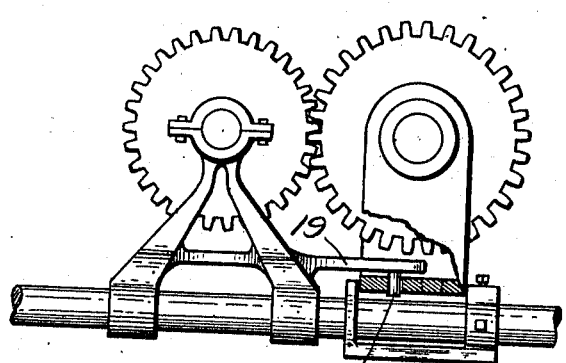
Fig. 4.
Fig. 6.
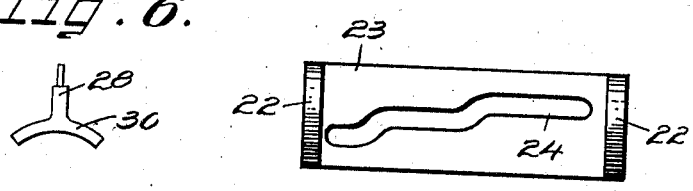
Fig. 5.
Witnesses
S. P. Buck.
P. M. Smith.
Inventor
Bernard Borgman
By Victor J. Evans
Attorney.

UNITED STATES PATENT OFFICE.

BERNARD BORGMAN, OF GENEVA, NEW YORK.

VARIABLE-SPEED TRANSMISSION-GEARING.

970,879.

Specification of Letters Patent. Patented Sept. 20, 1910.

Application filed September 14, 1909. Serial No. 517,631.

*To all whom it may concern:*

Be it known that I, BERNARD BORGMAN, a citizen of the United States, residing at Geneva, in the county of Ontario and State of New York, have invented new and useful Improvements in Variable-Speed Transmission-Gearing, of which the following is a specification.

This invention relates to variable speed transmission gearing and is designed with special reference to motor-driven vehicles, the mechanism embodying means for enabling the driver to readily shift from one speed to another and thereby varying the relative speed and power transmitted to the drive shaft of the machine for a purpose well understood by those familiar with the art to which the invention appertains.

With the above and other objects in view the invention consists in the novel construction, combination and arrangement of parts hereinafter fully described, illustrated and claimed.

Figure 1:
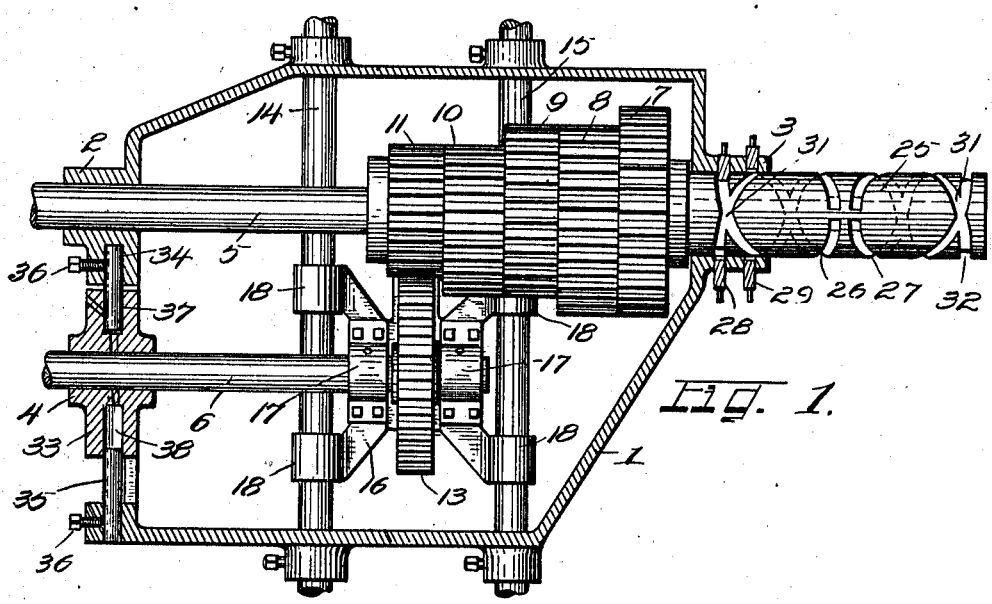
Figure 2:
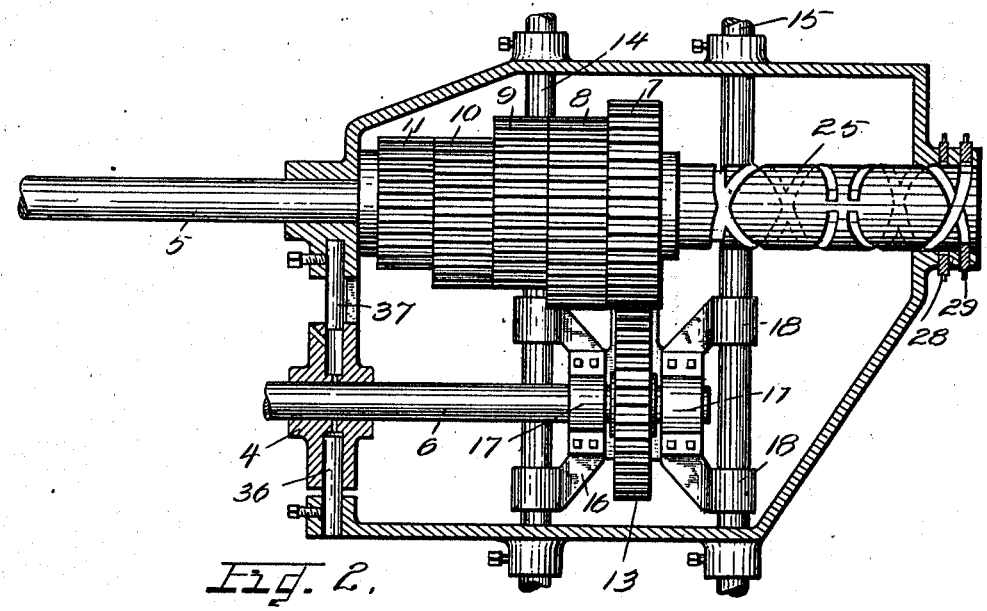

In the accompanying drawings:—Figure 1 is a longitudinal section through the gear case, showing the transmission gearing in elevation. Fig. 2 is a similar view showing another position of the gears. Fig. 3 is a longitudinal section taken at right angles to Figs. 1 and 2 and extending through the gears, leaving the driving shaft in elevation. Fig. 4 is an end view of the transmission gearing omitting the gear case. Fig. 5 is a detail elevation of the yoke. Fig. 6 is a detail view of one of the dogs.

Referring to the drawings 1 designates the gear case which is of suitable shape to inclose the several gears hereinafter particularly described and portions of the shafts on which said gears are mounted, said gear case being provided with suitable bearings 2, 3 and 4 of said shafts. By preference this gear case is constructed so as to be oil-tight thereby enabling the gears hereinafter described to run in oil.

5 designates what will be termed in this description the drive shaft and 6 designates the driven shaft, but it will be apparent as the description proceeds that either of said shafts may constitute the drive shaft and the remaining shaft the driven shaft. Mounted on the shaft 5 is a series of gears designated at 7, 8, 9, 10 and 11. All these gears are mounted side by side as shown in Figs. 1, 2 and 3 on the shaft 5 while the intermediate gears 8 and 10 are eccentric and are arranged as clearly illustrated in Figs. 1, 2 and 3 so that the teeth thereof register at one side with the concentric gears at one side thereof and at the opposite side with the concentric gears at the other side thereof, for instance the gear 8 is shown in Figs. 1 and 2 as having the teeth thereof in registry with the teeth of the wheel 9 at the top of the wheel while the teeth at the bottom of the gear 8 are in registry with the teeth 7 at the bottom of said gear. The same arrangement is obtained with respect to the gears 10, 11 and 9. All of the gears 7, 8, 9, 10 and 11 are keyed or feathered to the shaft 5 as shown in Fig. 3, the shaft 5 being provided with a head 12 extending lengthwise thereof within the gear case to admit of the whole series of gears being slid lengthwise of said shaft for the purpose of throwing any one of said gears into and out of mesh with a single gear 13 mounted fast on the shaft 6 above referred to.

The shifting of the gears is accomplished by the mechanism now to be described.

14 and 15 designate parallel rods having their opposite ends connected to opposite sides of the gear case as shown in Figs. 1 and 2. Mounted to slide on the guides 14 and 15 is a slide or carriage 16 having bearings 17 for the shaft 6 above referred to, the gear 13 occupying a position between the bearings 17 and the slide comprising sleeves or collars 18 which embrace guides 14 and 15. The slide also embodies an operating arm or extension 19 which is provided with a laterally projecting pin or stud 20 the purpose of which will hereinafter appear.

21 designates a yoke which is substantially U-shaped and which comprises a pair of substantially parallel arms 22 which lie at opposite sides of the series of gears and cause the simultaneous movement of all of said gears in the shaft 5. The connecting or body portion of the yoke forms a cam plate 23 formed with a cam slot 24 having a plurality of spaces as shown in Fig. 5 or in other words alternately arranged longitudinal and oblique portions which act successively on the pin 20 which is received in the slot 24 and which is operated upon by the cam plate 23 of the yoke when said yoke is slid in the direction of the length of the shaft 5.

The means for sliding the yoke in the direction referred to consists of a sleeve 25 provided with reversely inclined spiral grooves 26 and 27. This sleeve 25 is connected at one end to the yoke 23 and works through the bearing 3 of the gear case. Mounted in said bearing 3 are two dogs 28 and 29 each of which is formed as shown in Fig. 6 or in other words is provided with an arcuate or segmental portion 30 which causes the dog to maintain its proper position in the spiral groove in which it is placed and enables said dog to pass by the intersection point 31 of the spiral grooves 26 and 27 as the sleeve 25 is turned. The grooves 26 and 27 terminate at their opposite ends in annular or circumferential grooves 32 so that said sleeve may be only carried to a certain predetermined distance in either direction.

As the shaft 6 must shift laterally when the gear wheel 13 is shifted by and with the slide 16, the gear case 1 is provided with a sliding section 33 the same being held in place and guided by means of oppositely arranged and longitudinally alining guide pins 34 and 35 which are received in sockets in the fixed portion of the gear case where they are held by set screws 36, the sliding section 33 of the gear case being also provided with holes or sockets 37 and 38 to receive said pins as shown in Figs. 1 and 2. It is intended to have the sliding section 33 of the gear case so mounted as to form an oil-tight joint with the remainder of the gear case, to prevent the leakage of oil therefrom.

In operation, the operating dogs are forced into engagement with the spiral grooves of the sleeve 25 at such time as the periphery of the concentric and eccentric gears register and come in line with the periphery of the gear 13. As the yoke 23 moves lengthwise of the shaft 5, it acts on the pin 20 to shift the slide 16 in a direction at right angles to the axis of the gears. In this way the gears are shifted so as to throw anyone of the concentric gears 7, 9 and 11 into mesh with the single gear 13, the teeth of the gear 13 passing by the teeth of the eccentric gears in such shifting operation. It will thus be seen that the shifting operation is accomplished by means of eccentric gears used in connection with concentric gears the gear as a whole being shifted while in mesh and without disengaging the clutch of the motor car or other motor-propelled vehicle.

I claim:—

1. Variable speed transmission gearing comprising a drive shaft and a driven shaft parallel with each other, a single gear on one of said shafts, and a series of gears on the other shaft, said series of gears embodying alternately arranged concentric and eccentric members, and means for shifting said series of gears across the periphery of the single gear and correspondingly shifting the single gear to compensate for the variation in the diameters of the members forming the series of gears.

2. Variable speed transmission gearing embodying parallel shafts, a single gear fast on one of said shafts, a slide having bearings for the shaft of the single gear and movable at right angles to the length of said shaft, a series of gears mounted slidably on the other shaft and composed of alternately arranged concentric and eccentric members, and means for simultaneously shifting the series of gears on the shaft thereof and also shifting the slide by which the single gear is carried to compensate for variations in the diameters of the members of the series of gears.

3. Variable speed transmission gearing comprising parallel shafts, a single gear on one of said shafts, a slide having bearings for the shaft of the single gear and movable at right angles to the length of said shaft, a series of gears on the other shaft composed of alternately arranged concentric and eccentric members, and a sliding yoke embracing the series of gears and operatively connected with said slide for shifting said slide transversely of said shafts.

4. Variable speed transmission gearing comprising parallel shafts, a single gear fast on one of said shafts, a slide having bearings for the shaft of the single gear and movable at right angles to the direction of length of said shaft, a series of gears mounted to slide across the periphery of said single gear and composed of alternately arranged concentric and eccentric members, a yoke for sliding said series of gears, means connecting said yoke with the slide for causing said slide to shift when the yoke is actuated, and means for shifting said yoke consisting of a spirally grooved sleeve embracing the shaft of the series of gears and connected at one end to the yoke, and one or more dogs movable into and out of engagement with said spirally grooved sleeve.

5. Variable speed transmission gearing comprising a gear casing embodying a slidable section, parallel shafts one of which has a bearing in the slidable section of the gear case and is shiftable therewith, a single gear wheel fast on the shiftable shaft, a slide having bearings for the shaft of the single gear and movable at right angles to the length of said shaft, a series of gears mounted on the other shaft and shiftable across the periphery of the single gear and composed of alternately arranged concentric and eccentric members, a yoke embracing the series of gears shiftable therewith, said yoke coöperating with the slide for simultaneously shifting the latter at right angles to the direction of movement of the yoke, and means for shifting said yoke.

6. Variable speed transmission gearing comprising a gear casing, parallel shafts, a single gear wheel fast on one of said shafts, a slide provided with bearings for the shaft of the single gear and movable at right angles to the direction of length of said shaft, a series of gears mounted on the other shaft and slidable across the periphery of the single gear composed of alternately arranged concentric and eccentric members, a yoke embracing the series of gears and shiftable therewith in the same direction, said yoke embodying a cam plate, a pin on the slide operated upon by said cam plate, and means for shifting said yoke.

In testimony whereof I affix my signature in presence of two witnesses.

BERNARD BORGMAN.

Witnesses:
W. S. O'BRIEN,
A. C. DORAN.